(12) United States Patent
Mai et al.

(10) Patent No.: US 7,823,569 B2
(45) Date of Patent: Nov. 2, 2010

(54) METHOD AND DEVICE FOR CONTROLLING AN INTERNAL COMBUSTION ENGINE

(75) Inventors: Wolfgang Mai, Eschborn (DE); Jens Pache, Kaufungen (DE)

(73) Assignee: Continental Automotive GmbH, Hannover (DE)

( * ) Notice: Subject to any disclaimer, the term of this patent is extended or adjusted under 35 U.S.C. 154(b) by 235 days.

(21) Appl. No.: 12/235,982

(22) Filed: Sep. 23, 2008

(65) Prior Publication Data
US 2009/0088953 A1 Apr. 2, 2009

(30) Foreign Application Priority Data
Sep. 28, 2007 (DE) .................. 10 2007 046 481

(51) Int. Cl.
*F02M 33/02* (2006.01)
*F02M 33/04* (2006.01)
(52) U.S. Cl. ...................... 123/520; 701/104
(58) Field of Classification Search ............. 123/520, 123/519, 518, 516, 703, 672, 198 D; 701/104, 701/103
See application file for complete search history.

(56) References Cited
U.S. PATENT DOCUMENTS

| 5,746,187 | A | 5/1998 | Ninomiya et al. | 123/520 |
|---|---|---|---|---|
| 5,988,150 | A * | 11/1999 | Osanai | 123/698 |
| 6,453,887 | B1 * | 9/2002 | Hayashi et al. | 123/520 |
| 7,469,685 | B2 * | 12/2008 | Osanai | 123/520 |
| 7,610,906 | B2 * | 11/2009 | Takakura et al. | 123/520 |
| 2001/0029933 | A1 * | 10/2001 | Fabre | 123/520 |

FOREIGN PATENT DOCUMENTS
DE 3502573 7/1986

* cited by examiner

*Primary Examiner*—Mahmoud Gimie
(74) *Attorney, Agent, or Firm*—King & Spalding L.L.P.

(57) ABSTRACT

According to a method for controlling an internal combustion engine by which the tank ventilation operation and an adjustment of the basic mixture can be carried out simultaneously, the engine is operated with an open tank ventilation valve. A first fuel amount correction value is determined for correction of a basic pilot control value for the amount of injected fuel. The regeneration gas volume flow rate is subsequently varied by a predefined change amount. A second fuel amount correction value is determined for correction of the basic pilot control value. Based on the first and second correction values and the flow rate change amount, a third fuel amount correction value is calculated by which the basic pilot control value would have to be corrected to again regulate the exhaust gas composition with a closed tank ventilation valve. Based on the third correction value the basic pilot control value is corrected.

15 Claims, 4 Drawing Sheets

METHOD AND DEVICE FOR CONTROLLING AN INTERNAL COMBUSTION ENGINE

CROSS-REFERENCE TO RELATED APPLICATIONS

This application claims priority from German Patent Application No. 10 2007 046 481.0 filed Sep. 28, 2007, and which the contents is incorporated herein by reference in its entirety.

TECHNICAL FIELD

The invention relates to a method for controlling an internal combustion engine as well as a control device for carrying out the method.

BACKGROUND

In order to adhere to the legal emission restrictions, modern motor vehicles with a spark ignition engine have a tank ventilation device by means of which fuel vapors escaping from the fuel tank are adsorbed in a fuel vapor reservoir (generally an activated charcoal container). Because the storage capacity of the fuel vapor reservoir is limited, it is necessary to regenerate said reservoir under suitable operating conditions of the internal combustion engine. For this purpose, the fuel vapor reservoir is connected to the inlet manifold of the internal combustion engine via a ventilation line. The controlled opening of a tank ventilation valve located in the ventilation line pneumatically connects the fuel vapor reservoir during the tank ventilation to the inlet manifold. Due to the partial pressure existing in the inlet manifold, the fuel vapors adsorbed in the fuel vapor reservoir are subsequently sucked as regeneration gas into the inlet manifold in order to partake in the combustion.

Through the hydrocarbons contained in the regeneration gas, in the event of the tank ventilation the composition of the fuel mixture undergoes a change. However, in order to ensure a sufficient combustion efficiency (quiet running) and an optimum exhaust gas purification it is necessary to adjust the air-to-fuel ratio of the fuel mixture to a defined value. In order to achieve this, the amount of metered fuel for the internal combustion engine is adjusted accordingly via injection valves. However, carrying out the tank ventilation is only possible in certain operating points of the internal combustion engine, namely at the point at which the partial pressure in the inlet manifold is high enough in order to suck in hydrocarbons that are adsorbed in the storage container. Therefore, the tank is preferably ventilated during idling or during partial load operation.

In addition, modern internal combustion engines have a lambda regulating device, i.e. a closed regulating loop for regulating the amount of fuel to be metered. Core elements of the lambda regulating device are represented by the lambda regulator, the fuel supply and a lambda sensor arranged in the exhaust gas tract of the internal combustion engine by means of which the composition of the exhaust gas can be measured and conclusions can be drawn with respect to the composition of the fuel mixture. In order to ensure optimum exhaust gas purification and good combustion stability, the exhaust gas composition or the fuel mixture composition has to be adjusted to a defined target value. In the case of a deviation of the composition of the fuel mixture or the exhaust gas from the target value, the amount of fuel supplied to the internal combustion engine is corrected as needed and in this way regulated to the target value.

The correction values determined in the process can also be used for the adjusting of the operating point-dependent pilot control of the components of the fuel injection and for diagnosing the same. For example, injection valves can have different characteristics depending on the operating point, which already have to be taken into consideration in the pilot control during an operating point changeover. In addition, the operating behavior of these components can also change over the service life. Such deviations in the behavior of these components are identified by the lambda regulating device and taken into consideration in the form of a corresponding correction value in the pilot control of the specific component. As a result, the combustion stability can be improved, which is particularly important during idling. The adjustment of the pilot control of the components of the amount of fuel regulating loop is also known as the adjustment of the basic mixture.

So far, it has not been possible to carry out the tank ventilation operation and the adjustment of the basic mixture simultaneously because it was not possible to separate the relevant effects from the fuel mixture composition. As already described above, the tank ventilation and the adjustment of the basic mixture are preferably carried out in operating ranges of the idle operation and the lower partial load operation of the internal combustion engine. By introducing new concepts for saving fuel such as for example the automatic stop-start mechanism, possible time windows for carrying out the above-mentioned processes are further reduced.

SUMMARY

According to various embodiments, a method and a device for controlling an internal combustion engine can be provided by means of which the tank ventilation and the adjustment of the basic mixture can be carried out simultaneously.

According to an embodiment, a method for controlling an internal combustion engine, to which a tank ventilation device has been allocated, may comprise the steps of: starting from one state in which a tank ventilation valve of the tank ventilation device is open:—operating the internal combustion engine at a stationary operating point,—controlling the tank ventilation valve in such a way that a defined regeneration gas volume flow rate flows from the tank ventilation device to the internal combustion engine and the regeneration gas partakes in the combustion,—determining a first fuel amount correction value by means of which a basic pilot control value has to be corrected for the amount of fuel to be injected in order to regulate the exhaust gas composition to a predefined target value,—varying the regeneration gas volume flow rate by means of a predefined change amount,—determining a second fuel amount correction value by means of which the basic pilot control value has to be corrected for the amount of fuel to be injected in order to again regulate the exhaust gas composition to the predefined target value after having varied the regeneration gas volume flow rate,—based on the first fuel amount correction value, the second fuel amount correction value and the change amount for the regeneration gas volume flow rate, calculating a third fuel amount correction value by means of which the basic pilot control value would have to be corrected for the amount of fuel to be injected in order to again regulate the exhaust gas composition to the predefined target value with a closed tank ventilation valve, and—based on the third fuel amount correction value, carrying out a correction of the basic pilot control value subsequently for the injected amount of fuel and/or for the diagnosis of a component allocated to the internal combustion engine.

According to another embodiment, a control device for an internal combustion engine, to which a tank ventilation device has been allocated, may be operable in such a way that starting from one state in which a tank ventilation valve of the tank ventilation device is open:—the internal combustion engine is operated at a stationary operating point,—the tank ventilation valve is controlled in such a way that a defined regeneration gas volume flow rate flows from the tank ventilation device to the internal combustion engine and the regeneration gas partakes in the combustion,—a first fuel amount correction value is determined by means of which a basic pilot control value has to be corrected for the amount of fuel to be injected in order to regulate the exhaust gas composition to a predefined target value,—the regeneration gas volume flow rate is varied by means of a predefined change amount,—a second fuel amount correction value is determined by means of which the basic pilot control value has to be corrected for the amount of fuel to be injected in order to again regulate the exhaust gas composition to the predefined target value after having varied the regeneration gas volume flow rate,—based on the first fuel amount correction value, the second fuel amount correction value and the change amount for the regeneration gas volume flow rate, a third fuel amount correction value is calculated by means of which the basic pilot control value would have to be corrected for the amount of fuel to be injected in order to again regulate the exhaust gas composition to the predefined target value with a closed tank ventilation valve, and—based on the third fuel amount correction value, a correction of the basic pilot control value is subsequently carried out for the injected amount of fuel and/or for the diagnosis of a component allocated to the internal combustion engine.

According to a further embodiment, the first fuel amount correction value and the second fuel amount correction value can be at least partially obtained from an outlet variable of a lambda regulating device. According to a further embodiment, the first fuel amount correction value and the second fuel amount correction value can at least be partially obtained from a pilot control value determined for the compensation of the amount of fuel supplied in addition by means of the regeneration gas flow rate. According to a further embodiment, the diagnosis relating to a fuel injection device of the internal combustion engine and the fuel injection device can be evaluated as defective if the third fuel amount correction value lies outside a predefined tolerance band. According to a further embodiment, a fuel concentration in the regeneration gas can be calculated based on the first fuel amount correction value, the second fuel amount correction value and the change amount for the regeneration gas volume flow rate.

BRIEF DESCRIPTION OF THE DRAWINGS

The invention is described in more detail below with reference to an exemplary embodiment specified in the schematic figures of the drawing, in which.

DETAILED DESCRIPTION

A control method in accordance with an embodiment relates to an internal combustion engine to which a tank ventilation device has been allocated. In this process, starting from one state in which a tank ventilation valve of the tank ventilation device is open, the internal combustion engine is operated at a stationary operating point. The tank ventilation valve is controlled in such a way that a defined regeneration gas volume flow rate flows from the tank ventilation device to the internal combustion engine and the regeneration gas partakes in the combustion. A first fuel amount correction value is determined by means of which a basic pilot control value has to be corrected for the amount of fuel to be injected in order to regulate the exhaust gas composition to a predefined target value. The regeneration gas volume flow rate is subsequently varied by means of a predefined change amount. A second fuel amount correction value is determined by means of which the basic pilot control value has to be corrected for the amount of fuel to be injected in order to again regulate the exhaust gas composition to the predefined target value after having varied the regeneration gas volume flow rate. Based on the first fuel amount correction value, the second fuel amount correction value and the change amount for the regeneration gas volume flow rate, a third fuel amount correction value is calculated by means of which the basic pilot control value would have to be corrected for the amount of fuel to be injected in order to again regulate the exhaust gas composition to the predefined target value with a closed tank ventilation valve. Based on the third fuel amount correction value, a correction of the basic pilot control value is subsequently carried out for the injected amount of fuel and/or for the diagnosis of a component allocated to the internal combustion engine.

Said method permits an adjustment of the basic mixture and/or a diagnosis of a component allocated to the internal combustion engine to be carried out during the execution of a tank ventilation operation. To this end, the regeneration gas volume flow rate or the degree of opening of the tank ventilation valve only has to be modified by a given amount during the tank ventilation operation. The main idea according to various embodiments is to quantify the proportion of the tank ventilation to the correction values for the fuel injection at a stationary operating point of the internal combustion engine by varying the regeneration gas volume flow rate and to obtain by calculation in a further step the proportion of the correction values, which are determined by operating point-dependent variations in the operating behavior of components. On the basis of this, an adjustment of the basic mixture and/or a diagnosis of the components can then be carried out. As a result of the fact that the tank ventilation, the adjustment of the basic mixture and/or a diagnosis of a component allocated to the internal combustion engine can be carried out simultaneously, the frequency of these processes can be substantially increased.

In embodiments of the method, the first fuel amount correction value and the second fuel amount correction value are at least partially obtained from an outlet variable of a lambda regulating device and/or from a pilot control value determined for the compensation of the amount of fuel supplied in addition by means of the regeneration gas flow rate.

Since both the outlet variables of the lambda regulating device and the pilot control value are conventionally determined in a corresponding control device for the compensation of the amount of fuel supplied in addition by means of the regeneration gas flow rate, the first fuel amount correction value and the second fuel amount correction value can be determined quantitatively in a simple manner.

In an embodiment of the method, the diagnosis relates to a fuel injection device of the internal combustion engine, with the fuel injection device being evaluated as defective if the third fuel amount correction value lies outside a predefined tolerance band.

In this way, the functional efficiency of a component can be evaluated with little effort.

In an embodiment of the method, a fuel concentration (CL) in the regeneration gas is calculated based on the first fuel amount correction value, the second fuel amount correction value, and the change amount for the regeneration gas volume flow rate.

In this way, the correct value can in addition be determined for the fuel concentration in the regeneration gas, which is of importance for the pilot control of the injection amount during the tank ventilation. The more precise the value for the fuel concentration in the regeneration gas, the less the activity of the lambda regulator.

A control device for an internal combustion engine in accordance with an embodiment is embodied for carrying out the method. Reference is made to the method embodiments with regard to the advantages thus obtained.

Figure 1:
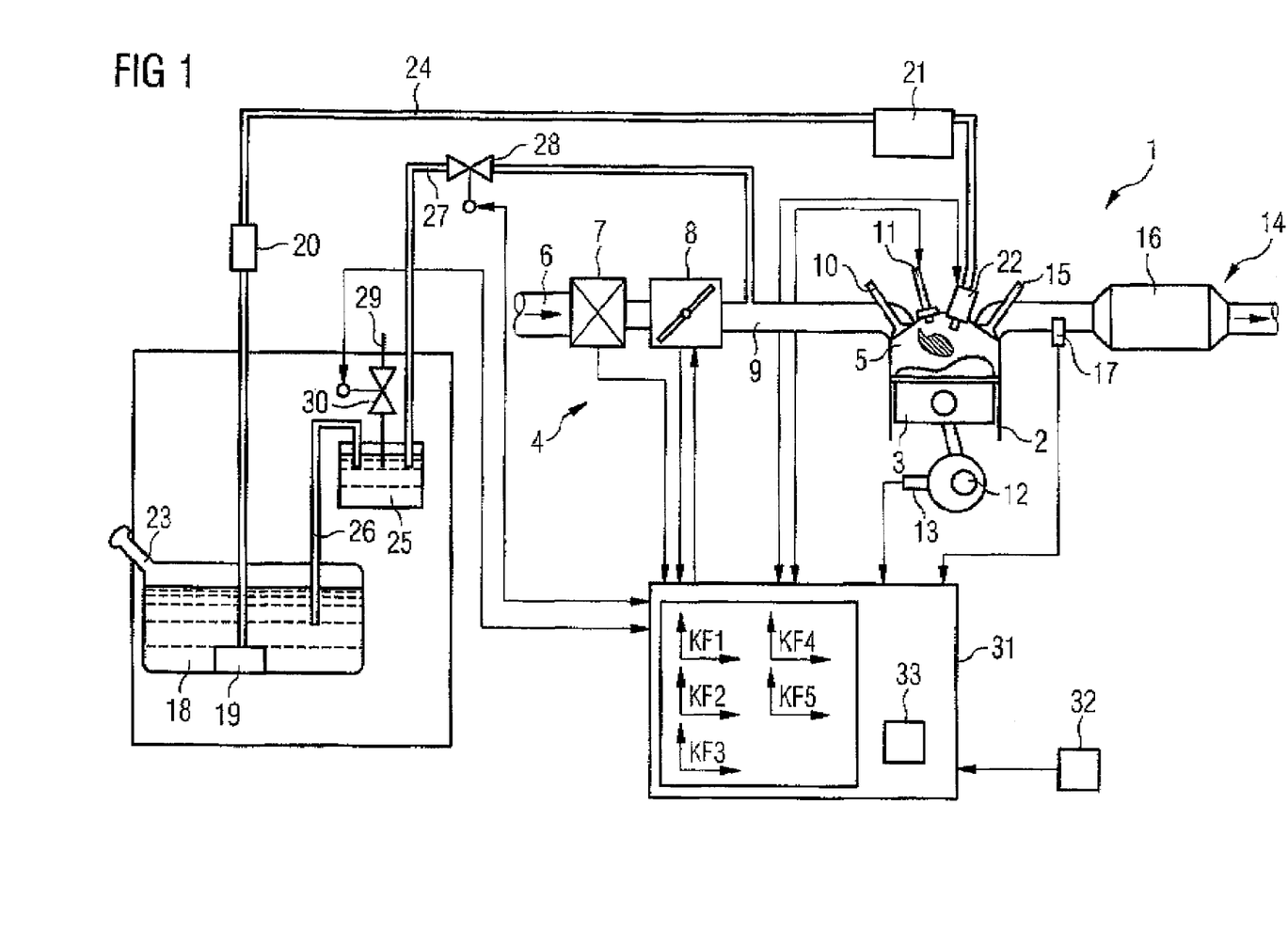
FIG. 1 shows a schematic view of an internal combustion engine.

FIG. 1 shows an exemplary embodiment of an internal combustion engine 1. The internal combustion engine 1 has at least one cylinder 2 and a piston 3 that moves up and down in the cylinder 2. The fresh air necessary for the combustion is introduced into a combustion chamber 5 bounded by the cylinder 2 and the piston 3 by means of an intake tract 4. An air mass sensor 7 for detecting the air throughput in the intake tract 4, which can be regarded as a measure for the load of the internal combustion engine 1, a throttle valve 8 for controlling the air throughput, an inlet manifold 9 and an inlet valve 10 by means of which the combustion chamber 5 is optionally connected to or separated from the intake tract 4 are located in the intake tract 4 downstream of an intake opening 6.

The fuel mixture is ignited by means of a spark plug 11. The motive energy generated by the combustion is transferred by means of a crankshaft 12 to the drive train of the motor vehicle (not illustrated). A rotational speed sensor 13 detects the rotational speed of the internal combustion engine 1.

The combustion exhaust gases are led away by means of an exhaust gas section 14 of the internal combustion engine 1. The combustion chamber 5 is optionally connected to the exhaust gas section 14 or separated from said exhaust gas section by means of an outlet valve 15. The exhaust gases are purified in an exhaust gas purifying catalytic converter 16. In addition, in the exhaust gas section 14 there is a so-called lambda sensor 17 for measuring the oxygen content in the exhaust gas. In this process, the lambda sensor 17 can be both a binary lambda sensor and a linear lambda sensor 17.

The internal combustion engine 1 in addition comprises a fuel supply device with a fuel tank 18, a fuel pump 19, a high-pressure pump 20, a pressure tank 21, and at least one controllable injection valve 22. The fuel tank 18 has a closeable filler neck 23 for filling said tank with fuel. The fuel is transported by the fuel pump 19 from the fuel tank 18 and into a fuel supply line 24. The high-pressure pump 20 and the pressure tank 21 are arranged in the fuel supply line 24. The purpose of the high-pressure pump 20 is to supply fuel to the pressure tank 21 under high pressure. In this process, the pressure tank 21 is embodied as a common pressure tank 21 for all the injection valves 22. Pressurized fuel is supplied from the said pressure tank to all the injection valves 22. The exemplary embodiment is an internal combustion engine 1 with direct fuel injection in the case of which the fuel is directly injected into the combustion chamber 5 by means of an injection valve 22 protruding into the combustion chamber 5. However, it is pointed out that the present invention is not limited to this kind of fuel injection, but can also be used in all other kinds of fuel injection such as for example inlet manifold injection.

The internal combustion engine 1 in addition has a tank ventilation device. A fuel vapor reservoir 25 is a part of the tank ventilation device, said reservoir for example being embodied as an activated charcoal container and connected to the fuel tank 18 by means of a connecting line 26. Fuel vapors developing in the fuel tank 18 are fed to the fuel vapor reservoir 25 and adsorbed there by the activated carbon. The fuel vapor reservoir 25 is connected to the inlet manifold 9 of the internal combustion engine 1 by means of a ventilation line 27. In the ventilation line 27, there is a controllable tank ventilation valve 28. In addition, fresh air can be supplied to the fuel vapor reservoir 25 by means of a ventilation line 29 and an optional controllable ventilation valve 30 arranged therein. In certain operating ranges of the internal combustion engine 1, in particular during idling or during partial load operation, a steep pressure gradient prevails between the surrounding area and the inlet manifold 9 on the basis of the strong throttle action by the throttle valve 8. Opening the tank ventilation valve and the ventilation valve 30 during a tank ventilation period of time therefore results in a purging effect in the case of which the fuel vapors stored in the fuel vapor reservoir 25 are fed as a regeneration gas flow rate to the inlet manifold 9 and partake in the combustion. In this way, the fuel vapors produce a change in the composition of the combustion gases and the exhaust gases.

A control device 31 is allocated to the internal combustion engine 1 in which characteristic curve-specific engine control functions (KF1 to KF5) have been implemented in terms of software. The control device 31 is connected to all the actuators and the sensors of the internal combustion engine 1 by means of signal lines and data lines. The control device 31 is in particular connected to the controllable ventilation valve 30, the controllable tank ventilation valve 28, the air mass sensor 7, the controllable throttle valve 8, the controllable injection valve 22, the spark plug 11, the lambda sensor 17, the rotational speed sensor 13 and an integrated pressure sensor/temperature sensor 32 for measuring the ambient pressure and the ambient temperature.

Parts of the internal combustion engine 1 and the control device 31 form a lambda regulating device. The lambda regulating device in particular comprises the lambda sensor 17, a lambda regulator 33 implemented in terms of software in the control device 31 as well as the injection valves 22 and their control mechanisms and control logic by means of which the metered amount of fuel is adjusted via the injection valves 22. The lambda regulator 33 is for example a PI regulator. The lambda regulating device forms a closed lambda regulating loop and is embodied in such a way that a deviation of the exhaust gas composition detected by the lambda sensor 17 from a predefined lambda target value is corrected by means of a correction of the fuel amount.

The amount of fuel to be supplied is essentially metered in one of two ways. On the one hand, an operating point-dependent basic pilot control value is determined by the control device 31 for the amount of fuel to be supplied. The operating point-dependent basic pilot control value is for example determined by means of a characteristic curve as a function of the rotational speed and a load parameter (amount of fresh air or inlet manifold pressure supplied). Data for the characteristic curve can for example be provided on a motor test stand.

On the other hand, changes in the operating conditions or ambient conditions require a corresponding adjustment of the amount of fuel to be supplied. In this process, the operating point-dependent basic pilot control value is corrected by corresponding fuel amount correction values. Typical situations, which require an adjustment of such a kind are the tank ventilation in the case of which additional fuel is supplied to the internal combustion engine or age-determined and operating point-dependent changes in the operating characteristic of components of the fuel supply (for example the injection valves 22).

When the tank is ventilated, additional fuel is supplied to the internal combustion engine 1. On the basis of the fuel concentration in the regeneration gas and the flow at the tank ventilation valve 28, a corresponding fuel amount correction value can be determined by the control device 33 in order to reduce the influence of the tank ventilation on the fuel mixture composition from the outset. In this process, the basic pilot control value is corrected by the fuel amount correction value in the form of a pilot control. The influence of the tank ventilation on the fuel mixture composition is not always completely compensated for by the fuel amount correction value.

Even in the case of age-determined and operating point-dependent changes in the operating characteristic of the components of the fuel injection, there is a deviation from the metered amount of fuel and for this reason an undesired change in the fuel mixture composition.

The lambda sensor 17 detects changes in the fuel mixture composition. In this case, the measured lambda value deviates from a current target value. This therefore results in a regulating deviation, which is registered by the lambda regulator 33 and regulated by a corresponding change in the regulator outlet variables. This takes place according to a corresponding adjustable variable at the injection valves 22 by means of which the injected amount of fuel is correspondingly corrected in such a way according to a fuel amount correction value until the discrepancy has been removed.

The amount of fuel to be supplied to the internal combustion engine at an operating point thus results from the basic pilot control value and the fuel amount correction values, which can be both pilot control values determined by the control device and the regulator initial values of the lambda regulator 33.

Figure 2A:
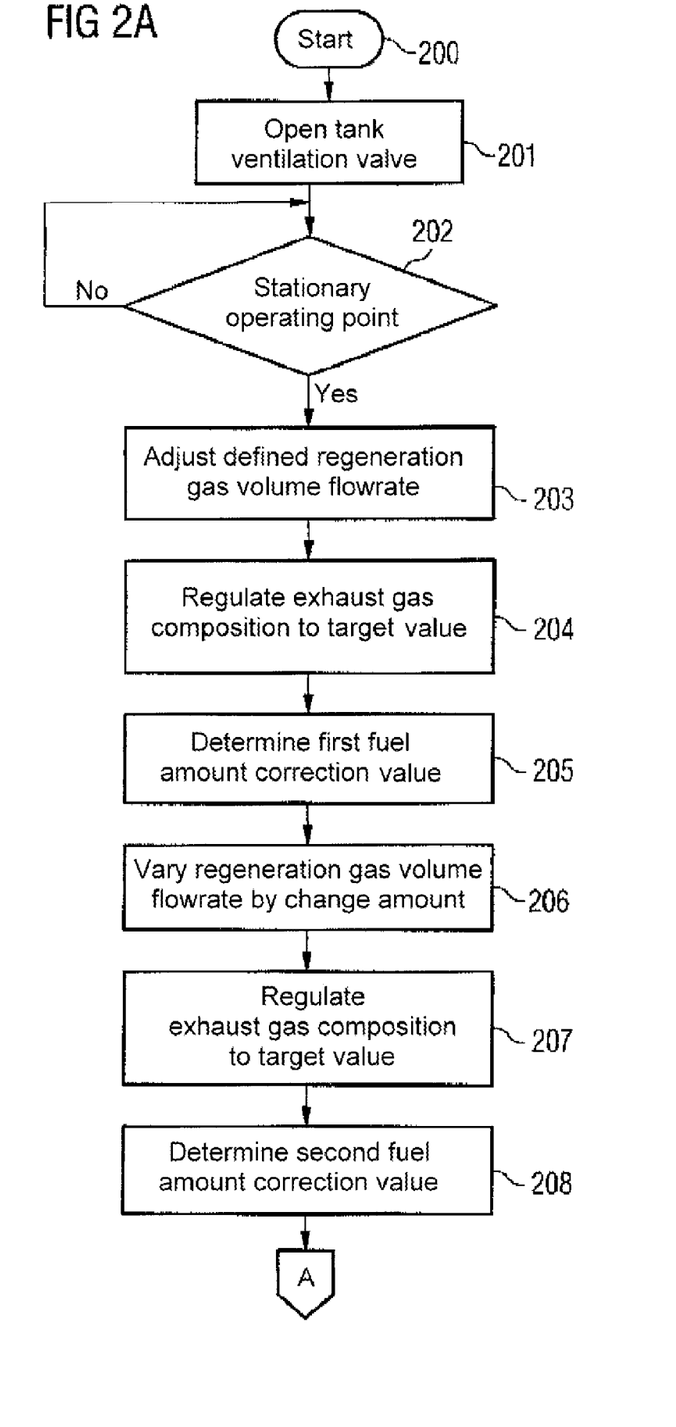
FIG. 2 shows an exemplary embodiment of a method for controlling an internal combustion engine in the form of a flowchart.
Figure 2B:
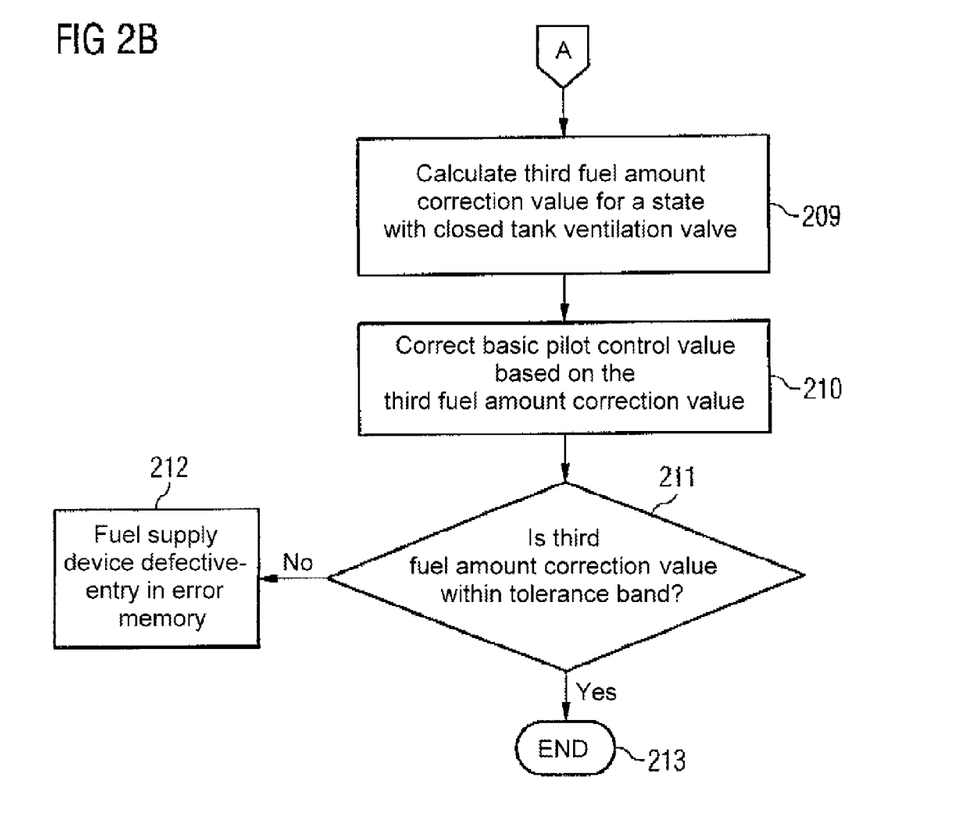
Figure 3:
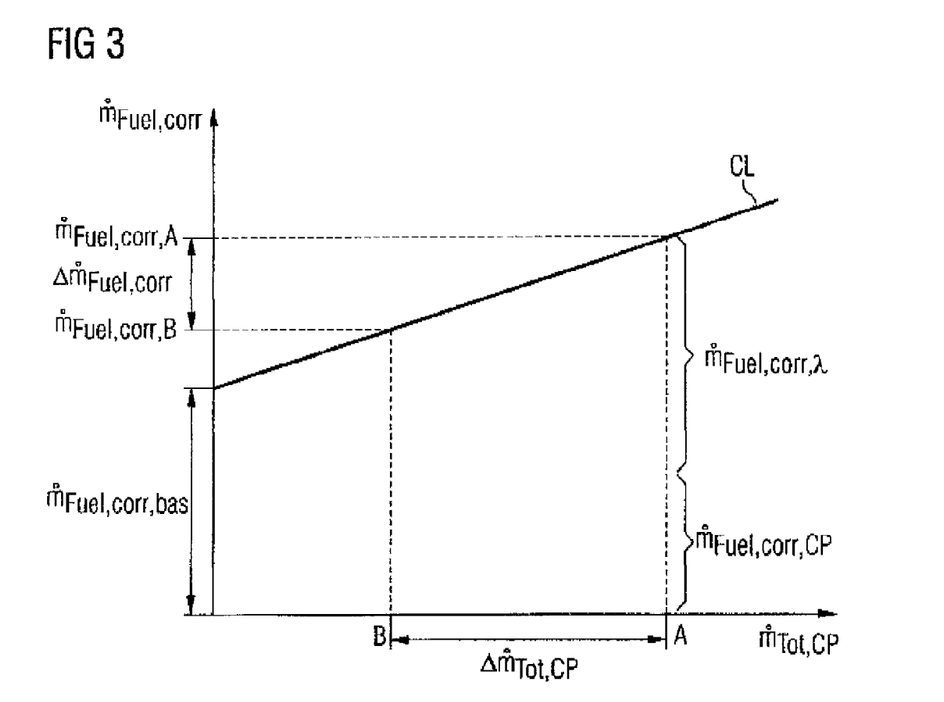
FIG. 3 shows a diagram for the further explanation of the exemplary embodiment of FIG. 2.

FIG. 2 shows an exemplary embodiment of a method for controlling the internal combustion engine 1 in the form of a flowchart. FIG. 3 illustrates the method. In this process, the fuel amount correction value $\dot{m}_{FuelCorr}$ is represented over the total regeneration gas flow rate $\Delta \dot{m}_{Tot,CP}$. In this process, the fuel amount correction value $\dot{m}_{FuelCorr}$ sets the sum of the fuel amount correction values (as described above) by means of which the basic pilot control value has to be corrected for the amount of fuel to be supplied in order to regulate the exhaust gas composition to the target value.

The method is started with step 200, for example on starting the internal combustion engine 1.

In a step 201, a tank ventilation operation is started at any operating point in a suitable operating range such as for example during idling or in the lower partial load area by opening the tank ventilation valve 28. In this process, regeneration gas flows in from the tank ventilation device into the internal combustion engine 1 and partakes in the combustion. The tank ventilation valve 28 remains open during the following steps. In order to reduce the influence of the tank ventilation on the fuel mixture composition, the basic pilot control value for the amount of fuel to be supplied is corrected by means of a fuel amount correction value on opening the tank ventilation valve. This fuel amount correction value can be determined on the basis of the fuel concentration in the regeneration gas and the flow through the tank ventilation valve 28. However, the value of the fuel concentration can have inaccuracies so that the compensation is incomplete. However, this is balanced by the lambda regulator 3.

In a step 202, a test is performed to determine whether or not there is a stationary operating point of the internal combustion engine. A stationary operating point is then for example identified when the rotational speed and the amount of fresh air are within a tolerance band over a predefined period of time. The testing is repeated until a positive result is obtained. In this process, the stationary operating point does not have to be identical to the operating point at which the tank ventilation valve 28 was opened.

In the case of a positive result of the test in step 202, in a step 203 the tank ventilation valve 28 is controlled in such a way that a defined, constant regeneration gas volume flow rate $\dot{m}_{Tot,CP,A}$ (see FIG. 3) is set.

In a step 204, the lambda regulator 33 regulates the exhaust gas composition to the target value. This can take place by outputting a regulator initial value in the form of a fuel amount correction value by means of which the basic pilot control value is corrected.

In a step 205, a first fuel amount correction value $\dot{m}_{Fuel,Corr,A}$ is determined. This first fuel amount correction value $\dot{m}_{Fuel,Corr,A}$ consists of the sum of all the fuel amount correction values by means of which the basic pilot control value has to be corrected for the fuel injection in order to regulate the exhaust gas composition to the target value in the case of a regeneration gas volume flow rate $\dot{m}_{Tot,CP,A}$. In the case of the exemplary embodiment, the first fuel amount correction value sets $\dot{m}_{Fuel,Corr,A}$ the sum from the fuel amount correction value $\dot{m}_{Fuel,Corr,CP}$ (see FIG. 3), which is obtained by calculation from the regeneration gas volume flow rate and the fuel concentration in the regeneration gas, and the fuel amount correction value $\dot{m}_{Fuel,Corr,\lambda}$ (see FIG. 3), which originates as the regulator initial value from the lambda regulator 33.

In step 206, the regeneration gas volume flow rate $\dot{m}_{Tot,CP}$ is reduced from the value $\dot{m}_{Tot,CP,A}$ by the difference $\Delta \dot{m}_{Tot,CP}$ to the value $\dot{m}_{Tot,CP,B}$ (see FIG. 3). Because of this variation in the regeneration gas volume flow rate $\dot{m}_{Tot,CP}$, the fuel amount correction value $\dot{m}_{Fuel,Corr,CP}$ of the control device also changes.

In step 207, the exhaust gas composition is again regulated to the target value by the lambda regulator 33.

In step 208, a second fuel amount correction value $\dot{m}_{Fuel,Corr,B}$ is determined. Analogous to the first fuel amount correction value $\dot{m}_{Fuel,Corr,A}$, the second fuel amount correction value $\dot{m}_{Fuel,Corr,B}$ also represents the sum of all the fuel amount correction values by means of which the basic pilot control value has to be corrected for the fuel injection in order to regulate the exhaust gas composition to the target value in the case of the regeneration gas volume flow rate $\dot{m}_{Tot,CP,B}$.

The values of the first fuel amount correction value $\dot{m}_{Fuel,Corr,A}$ and the second fuel amount correction value $\dot{m}_{Fuel,Corr,B}$ plot the straight line CL in the diagram of FIG. 3, the upward slope of which represents the fuel concentration in the regeneration gas. This is explained in greater detail further below.

In step 209, on the basis of the first fuel amount correction value $\dot{m}_{Fuel,Corr,A}$, the second fuel amount correction value $\dot{m}_{Fuel,Corr,B}$ and the change amount $\Delta \dot{m}_{Tot,CP}$ for the regeneration gas volume flow rate, a third fuel amount correction value $\dot{m}_{Fuel,Corr,bas}$ is calculated. The third fuel amount correction value $\dot{m}_{Fuel,Corr,bas}$ represents the value by means of which the basic pilot control value would have to be corrected for the amount of fuel to be injected in order to regulate the exhaust gas composition with a closed tank ventilation valve to the predefined target value again. For this reason, the third fuel amount correction value $\dot{m}_{Fuel,Corr,bas}$ only contains the corrections that are necessary to correct operating point-dependent changes in the composition of the mixture for example caused by deviations in the characteristics from the components of the fuel injection. As a result, the influence of the tank ventilation on the composition of the mixture is eliminated by calculation. In FIG. 3, the third fuel amount correction value $\dot{m}_{Fuel,Corr,bas}$ is obtained by the point of intersection of the line CL and the ordinates, i.e. in the case of a regeneration gas volume flow rate $\dot{m}_{Tot,CP}$ of zero. In this process, the calculation can take place as follows:

The general equation of the straight line CL is as follows:

$$\dot{m}_{Fuel,Corr} = \frac{\dot{m}_{Fuel,Corr} - \dot{m}_{Fuel-Corr,B}}{\Delta \dot{m}_{Tot,CP}} \times \dot{m}_{Tot,CP} + \dot{m}_{Fuel,Corr,bas} =$$

$$\frac{\Delta \dot{m}_{Fuel,Corr}}{\Delta \dot{m}_{Tot,CP}} \times \dot{m}_{Tot,CP} + \dot{m}_{Fuel,Corr,bas}$$

The third fuel amount correction value $\dot{m}_{Fuel,Corr,bas}$ can be calculated from this:

$$\dot{m}_{Fuel,Cor,A} = \frac{\dot{m}_{Fuel,Corr,A} - \dot{m}_{FuelCor,B}}{\Delta \dot{m}_{Tot,CP}} \times \dot{m}_{Tot,CPA} + \dot{m}_{Fuel,Corr,bas}$$

In this process, all the values for calculating the third fuel amount correction value $\dot{m}_{Fuel,Corr,bas}$ are known or can be determined by the control device.

The following is obtained:

$$\dot{m}_{Fuel,Cor,bas} = \dot{m}_{Fuel,Cor,A} - \frac{\dot{m}_{Fuel,Cor,A} - \dot{m}_{Fuel-Cor,B}}{\Delta \dot{m}_{Tot,CP}} \times \dot{m}_{Tot,CP,A}$$

Because the third fuel amount correction value $\dot{m}_{Fuel,Corr,bas}$ only contains the corrections that are necessary to correct operating point-dependent changes in the composition of the mixture for example caused by deviations in the characteristics from the components of the fuel injection, said value is thus used in step 210 to correct the basic pilot control value for this operating point of the internal combustion engine so that this deviation from the basic mixture during the next start-up is already contained in the basic pilot control value for the amount of fuel to be supplied. As a result, the activity of the lambda regulator 33 can clearly be released. This process is referred to as the adjustment of the basic mixture.

The third fuel amount correction value $\dot{m}_{Fuel,Corr,bas}$ can also be used for the diagnosis of the fuel supply device (contains all the components that are necessary for metering the fuel). This is carried out in step 211 in which a test is carried out to determine whether or not the third fuel amount correction value $\dot{m}_{Fuel,Corr,bas}$ is within a predefined tolerance band.

Should this not be the case, then the fuel supply device is evaluated as defective in step 212 and a corresponding entry is made in an error memory. Otherwise, the method can be ended with step 213 or as an alternative started anew.

As has already been mentioned further in the above, the value of the upward slope of the straight lines CL represents the fuel concentration in the regeneration gas. This can therefore be calculated in a simple manner by means of the following equation:

$$\text{Fuel concentration} = \frac{\Delta \dot{m}_{Fuel,Corr}}{\Delta \dot{m}_{Tot,CP}} = \frac{\dot{m}_{Fuel,Corr,A} - \Delta \dot{m}_{Fuel,Corr,D}}{\Delta \dot{m}_{Tot,CF}}$$

The method in accordance with an embodiment offers the advantage that the tank ventilation, the adjustment of the basic mixture and/or a diagnosis of a component can be carried out simultaneously. Unlike well-known methods, it is no longer necessary to carry out said methods in a separate manner. Especially with a view to current technologies such as for example the stop-start mechanism by means of which the periods of time suitable for the adjustment of the basic mixture, the diagnosis of components and the tank ventilation are increasingly limited, it is possible to carry out these measures with the necessary frequency by means of the described method.

What is claimed is:

1. A method for controlling an internal combustion engine, to which a tank ventilation device has been allocated, the method comprising the steps of: starting from one state in which a tank ventilation valve of the tank ventilation device is open operating the internal combustion engine at a stationary operating point, controlling the tank ventilation valve in such a way that a defined regeneration gas volume flow rate flows from the tank ventilation device to the internal combustion engine and the regeneration gas partakes in the combustion, determining a first fuel amount correction value by means of which a basic pilot control value has to be corrected for the amount of fuel to be injected in order to regulate the exhaust gas composition to a predefined target value, varying the regeneration gas volume flow rate by means of a predefined change amount, determining a second fuel amount correction value by means of which the basic pilot control value has to be corrected for the amount of fuel to be injected in order to again regulate the exhaust gas composition to the predefined target value after having varied the regeneration gas volume flow rate, based on the first fuel amount correction value, the second fuel amount correction value and the change amount for the regeneration gas volume flow rate, calculating a third fuel amount correction value by means of which the basic pilot control value would have to be corrected for the amount of fuel to be injected in order to again regulate the exhaust gas composition to the predefined target value with a closed tank ventilation valve, and based on the third fuel amount correction value, carrying out a correction of the basic pilot control value subsequently for the injected amount of fuel or for the diagnosis of a component allocated to the internal combustion engine.

2. The method according to claim 1, wherein the first fuel amount correction value and the second fuel amount correction value is at least partially obtained from an outlet variable of a lambda regulating device.

3. The method according to claim 1, wherein the first fuel amount correction value and the second fuel amount correction value are at least partially obtained from a pilot control value determined for the compensation of the amount of fuel supplied in addition by means of the regeneration gas flow rate.

4. The method according to claim 1, wherein the diagnosis relating to a fuel injection device of the internal combustion engine and the fuel injection device are evaluated as defective if the third fuel amount correction value lies outside a predefined tolerance band.

5. The method according to claim 1, wherein a fuel concentration in the regeneration gas is calculated based on the first fuel amount correction value, the second fuel amount correction value and the change amount for the regeneration gas volume flow rate.

6. A control device for an internal combustion engine, to which a tank ventilation device has been allocated, wherein the control device is operable in such a way that starting from one state in which a tank ventilation valve of the tank ventilation device is open the internal combustion engine is operated at a stationary operating point, the tank ventilation valve is controlled in such a way that a defined regeneration gas volume flow rate flows from the tank ventilation device to the internal combustion engine and the regeneration gas partakes in the combustion, a first fuel amount correction value is determined by means of which a basic pilot control value has to be corrected for the amount of fuel to be injected in order to regulate the exhaust gas composition to a predefined target value, the regeneration gas volume flow rate is varied by means of a predefined change amount, a second fuel amount correction value is determined by means of which the basic pilot control value has to be corrected for the amount of fuel to be injected in order to again regulate the exhaust gas composition to the predefined target value after having varied the regeneration gas volume flow rate, based on the first fuel amount correction value, the second fuel amount correction value and the change amount for the regeneration gas volume flow rate, a third fuel amount correction value is calculated by means of which the basic pilot control value would have to be corrected for the amount of fuel to be injected in order to again regulate the exhaust gas composition to the predefined target value with a closed tank ventilation valve, and based on the third fuel amount correction value, a correction of the basic pilot control value is subsequently carried out for at least one of the injected amount of fuel and the diagnosis of a component allocated to the internal combustion engine.

7. The device according to claim 6, wherein the first fuel amount correction value and the second fuel amount correction value is at least partially obtained from an outlet variable of a lambda regulating device.

8. The device according to claim 6, wherein the first fuel amount correction value and the second fuel amount correction value are at least partially obtained from a pilot control value determined for the compensation of the amount of fuel supplied in addition by means of the regeneration gas flow rate.

9. The device according to claim 6, wherein the diagnosis relating to a fuel injection device of the internal combustion engine and the fuel injection device are evaluated as defective if the third fuel amount correction value lies outside a predefined tolerance band.

10. The device according to claim 6, wherein a fuel concentration in the regeneration gas is calculated based on the first fuel amount correction value, the second fuel amount correction value and the change amount for the regeneration gas volume flow rate.

11. A method for controlling an internal combustion engine, to which a tank ventilation device has been allocated, the method comprising the steps of: starting from one state in which a tank ventilation valve of the tank ventilation device is open operating the internal combustion engine at a stationary operating point, controlling the tank ventilation valve in such a way that a defined regeneration gas volume flow rate flows from the tank ventilation device to the internal combustion engine and the regeneration gas partakes in the combustion, determining a first fuel amount correction value by means of which a basic pilot control value has to be corrected for the amount of fuel to be injected in order to regulate the exhaust gas composition to a predefined target value, varying the regeneration gas volume flow rate by means of a predefined change amount, determining a second fuel amount correction value by means of which the basic pilot control value has to be corrected for the amount of fuel to be injected in order to again regulate the exhaust gas composition to the predefined target value after having varied the regeneration gas volume flow rate, based on the first fuel amount correction value, the second fuel amount correction value and the change amount for the regeneration gas volume flow rate, calculating a third fuel amount correction value by means of which the basic pilot control value would have to be corrected for the amount of fuel to be injected in order to again regulate the exhaust gas composition to the predefined target value with a closed tank ventilation valve, and based on the third fuel amount correction value, carrying out a correction of the basic pilot control value subsequently for the injected amount of fuel and for the diagnosis of a component allocated to the internal combustion engine.

12. The method according to claim 11, wherein the first fuel amount correction value and the second fuel amount correction value is at least partially obtained from an outlet variable of a lambda regulating device.

13. The method according to claim 11, wherein the first fuel amount correction value and the second fuel amount correction value are at least partially obtained from a pilot control value determined for the compensation of the amount of fuel supplied in addition by means of the regeneration gas flow rate.

14. The method according to claim 11, wherein the diagnosis relating to a fuel injection device of the internal combustion engine and the fuel injection device are evaluated as defective if the third fuel amount correction value lies outside a predefined tolerance band.

15. The method according to claim 11, wherein a fuel concentration in the regeneration gas is calculated based on the first fuel amount correction value, the second fuel amount correction value and the change amount for the regeneration gas volume flow rate.

* * * * *